United States Patent [19]

Samson

[11] 4,199,703
[45] Apr. 22, 1980

[54] LOW INDUCTANCE, HIGH INTENSITY, GAS DISCHARGE VUV LIGHT SOURCE

[76] Inventor: James A. R. Samson, 1600 Regency Dr., Lincoln, Nebr. 68520

[21] Appl. No.: 948,506

[22] Filed: Oct. 4, 1978

[51] Int. Cl.² .................. H01J 1/92; H01J 61/067; H01J 61/28; H01J 61/30
[52] U.S. Cl. .................. 313/204; 313/217; 313/220; 313/231.7; 313/237
[58] Field of Search .............. 313/231.7, 217, 204, 313/21, 23, 7, 44, 220, 32, 36, 237

[56] References Cited

U.S. PATENT DOCUMENTS

| | | | |
|---|---|---|---|
| 3,026,435 | 3/1962 | McPherson | 313/22 |
| 3,339,109 | 8/1967 | Morlais et al. | 313/204 X |
| 3,437,950 | 4/1969 | Okaya et al. | 313/44 X |
| 3,651,358 | 3/1972 | Troue | 313/23 X |
| 3,898,586 | 8/1975 | Nelson et al. | 313/217 X |

*Primary Examiner*—Palmer C. Demeo
*Attorney, Agent, or Firm*—Larson, Taylor and Hinds

[57] ABSTRACT

A gas discharge vuv light source is disclosed having low inductance and a high intensity output covering a range from 90 Å to 6000 Å. The source comprises a capillary defining a first bore removably, and at least partially, mounted within an air-cooled ceramic insulator; a first, hollow, cylindrical electrode having a removable insert defining a second bore disposed in end-to-end, coaxial relationship with one end of the capillary, and a second, hollow electrode which is configured to define a cavity and so as both to support the insulator such that the first and second bores are coaxially aligned with the cavity, and to releasably support either a tubular insert or a finned plate insert; and metallic vacuum seals connecting the electrodes to the insulator such that a gas-tight seal is formed between each electrode and the insulator at locations isolated from the first and second bores and from the cavity.

8 Claims, 8 Drawing Figures

LOW INDUCTANCE, HIGH INTENSITY, GAS DISCHARGE VUV LIGHT SOURCE

FIELD OF THE INVENTION

The present invention relates in general to vacuum ultraviolet radiation sources, and, in particular, to vacuum ultraviolet radiation sources of the gas discharge type.

BACKGROUND OF THE INVENTION

Much effort has been devoted to the development of light sources producing radiation in the so-called vacuum ultraviolet (vuv) region of the electromagnetic radiation spectrum, i.e., the region covering radiation which has a wavelength of between approximately 2 Å and 2000 Å and which is absorbed by any appreciable amount of gas. Reference is made to applicant's work, entitled *Techniques of Vacuum Ultraviolet Spectroscopy*, published by Wiley & Sons, N.Y. (1967), for an extensive discussion of the activity in this important research field.

Generally speaking, there are a number of features common to all vuv sources. With the exception of synchrotron radiation devices, all vuv sources operate on the principle of an electrical discharge in an ionizable gas or vapor. The electrical discharge is also typically confined to a capillary and is viewed "end-on". Since optically transparent materials are also highly absorbent to vuv radiation, vuv sources must be operated without windows. Several factors are known to affect the wavelength of the radiation emitted by a source, including the mechanism of discharge, the voltage employed to create the discharge, the amount of electrical current passed through the source, and the nature of the gas or vapor being ionized. Typically, a direct current (dc) discharge produces radiation of wavelengths longer than 900 Å, whereas alternating current (ac) discharge tends to produce radiation of shorter wavelengths.

The nature of vuv radiation and its generation by gas discharge imposes stringent requirements on the design of vuv light sources, and the operating conditions of such sources place a severe strain on the apparatus. As a consequence, conventional gas discharge sources, an illustrative example of which is disclosed in U.S. Pat. No. 3,026,435 (McPherson), suffer from a number of disadvantages which have limited their utility.

A principal disadvantage of prior art sources is that the electrodes and capillaries are not readily replaceable without substantial dismantling of the apparatus, nor are electrodes and capillaries having differing dimensions and configurations easily substituted in such devices. As a consequence, conventional sources have only limited, if any, capability of operating as both a glow and spark discharge device. Further, the difficulty of modifying conventional sources and substituting components severely limits the ability to "fine tune", or optimize the performance characteristics of such sources for a variety of specialized applications.

Another major disadvantage of prior art gas discharge light sources is that although the desirability of minimizing the inductance of the electric circuit supplying power to the source for spark discharge operation thereof has been recognized, the sources themselves possess a relatively large inductance which limits the frequency and peak current at which such sources can be operated for a given capacitance. The inductance of the McPherson device, for example, is so large that ac operation thereof is limited to relatively low frequency, continuous wave currents.

A further disadvantage of conventional light sources is that the discharge capillary is water-cooled, such as, for example, by a "water-jacket" as disclosed in the McPherson patent, or by the arrangement shown in FIG. 5.62 of applicant's work *Techniques in Vacuum Ultraviolet Spectroscopy*, referred to hereinabove. Cooling of the capillary in this manner limits the size of the discharge current which can be attained because high current densities will wear away the capillary causing the water cooled capillary to break.

A still further disadvantage of the conventional light sources of the type exemplified by the McPherson patent is that a substantially uniform gas pressure is maintained throughout the source, including the capillary and front electrode, which results in a substantial reduction in the intensity of the light produced by such sources.

SUMMARY OF THE INVENTION

These and other disadvantages of the prior art are overcome by a low inductance, high output gas discharge vuv light source constructed in accordance with the present invention, which has interchangeable components and air-cooled capillaries, and which, with only minor, readily accomplished, alterations, is capable of operating in both a glow discharge mode with direct currents as small as a few milliamps, and in a spark discharge mode with energizing pulses of nanosecond duration, and typical voltages of 5000 volts and peak currents of 3000 amperes. Vuv radiation can thus be produced having a wavelength as short as 90 Å, as well as radiation having a wavelength as long as 6000 Å. In addition, the source of the present invention is of an all metal-and-ceramic construction, which allows the source to be baked to approximately 700° C., and thus is ideally suited for use in ultra-high vacuum work.

More specifically, a source constructed in accordance with the present invention comprises a capillary defining a first bore at least partially mounted within an air-cooled ceramic insulator; a first hollow electrode adapted to be liquid cooled and defining a second bore disposed in end-to-end relationship with one end of the capillary; a second, hollow electrode defining a cavity disposed such that the cavity is adjacent the other end of the capillary; and metallic vacuum seals connecting the first and second electrodes to the insulator such that a gas-tight seal is formed between each of the electrodes and the insulator at locations isolated from the first and second bores and from the second electrode cavity.

In accordance with another aspect of the present invention which minimizes the inductance of the source, the first and second electrodes have substantially cylindrical outer configurations and are coaxially aligned so as to define an optical axis, and the second electrode includes a cylindrical housing surrounding the first electrode and insulator as closely as possible.

In accordance with a further aspect of the present invention, the first bore is dimensioned such that a pressure sufficent to maintain an electrical discharge in an ionizable gas may be attained in the second bore, and such that a pressure differential may be created therein. Further, ionizable gas is introduced into the second bore at the distal end thereof; and a region including at least a portion of the second electrode cavity is evacuated, thereby maximizing the intensity of the light which can be produced.

In accordance with a still further aspect of the invention, the first and second electrodes each comprise cylindrical support housings which are configured so as to receive the insulator and cooperate with the vacuum seals. The first electrode further comprises a tubular, electrically conductive, insert removably mounted in the support housing. The second electrode support housing is configured so as to define the cavity and to releasably support either a tubular insert in coaxial alignment with the optical axis, or a plate having an opening in the center thereof such that the plate is axially spaced from the associated capillary end in orthogonal relationship to the optical axis of the source, and with the plate opening coaxially aligned with the optical axis.

Other features and advantages of the invention will be set forth in, or apparent from, the detailed description of the preferred embodiments found hereinbelow.

DETAILED DESCRIPTION OF THE PREFERRED EMBODIMENT

A preferred embodiment of an ultraviolet light source constructed in accordance with the present invention will now be described with reference to FIGS. 1-2. The light source, which is generally denoted 10, basically comprises a hollow, air-cooled insulator 20; a discharge capillary 30 defining a bore 32 at least partially mounted within insulator 20; a hollow electrode, generally denoted 40, defining a bore 42 disposed at one end of capillary 30; a hollow electrode, generally denoted 50, defining a cavity 52 disposed at the other end of capillary 30; and an evacuating pump unit, generally denoted 70, for withdrawing gas from a region which includes a least a portion of a cavity 52, and through which the light which is produced travels to the apparatus in which the light is to be utilized.

Capillary 30 and electrodes 40 and 50 are coaxially aligned such that bores 32 and 42 and cavity 52 define an optical axis.

Insulator 20 functions as an electrical insulator, as a vacuum housing and seal, and as a precision support to maintain accurate concentricity of capillary 30 relative to the optical axis of source 10. Consequently, insulator 20 preferably is ceramic, and insulator 20 and capillary 30 are both cylindrical and are concentric with respect to each other to facilitate mounting of capillary 30 in source 10 such that bore 32 is aligned with the optical axis. Further, insulator 20 preferably is long enough to provide adequate support for maintaining the concentricity of capillary 30 relative to the optical axis of source 10. Although insulator 20 should not be longer than capillary 30 to protect the ceramic from damage by the electrical discharge, it is not necessary that capillary 30 be mounted completely within insulator 20. An insulator approximately 1½ inches (3.8 cm) long has proven to be suitable in practice. Further, if a shorter embodiment of insulator 20 is employed, such that electrode 40 is disposed relatively near cavity 52, a larger electric field for a given voltage is produced and thus enables the discharge in the glow discharge mode of operation to be more easily triggered at a lower voltage.

Capillary 30 may be made from different materials, such as, for example, boron nitride, quartz, pyrex, ceramic, and the like. However, a good conductor of heat, such as boron nitride, is preferred because it provides a lower and more uniform temperature which protects insulator 20 from thermal shock and hence breakage.

Capillary bore 32 preferably has a diameter of between 1 and 3 mm. A narrow bore 32 enhances the light output of source 10 by concentrating the discharge and by allowing a pressure drop to be established, as will be described in more detail hereinbelow. It is to be noted in particular that a bore 32 having a diameter of 1 to 2 mm, when used with the glow discharge embodiment of electrode 50 to be described in more detail hereinbelow, optimizes source 10 for the new field of photoelectron spectroscopy.

The length of bore 32 is not critical, although it has been discovered that spark discharges are optimized with a bore length of between 1½ and 2 inches (3.8 cm and 5.1 cm), and glow discharges are optimized with a bore length in excess of 2 inches (5.1 cm). It is also to be noted that the length of bore 32 does produce different effects on the light output, which effects are important in particular applications. For example, a long bore gives good intensity but broadens the width of the emission lines. Conversely, a short bore narrows the emission lines. Further, an embodiment of capillary 30 can be used which extends up to the slits of a monochromator or other device with which source 10 is being used so as to provide the maximum light intensity possible.

Capillary 30 advantageously is removably mounted in insulator 20 to facilitate replacement of damaged units and substitution of embodiments having lengths and bores of different dimensions, and thus allow the light output form source 10 to be readily optimized, as will be explained in more detail hereinbelow.

To facilitate substitution and precise positioning, capillary 30 advantageously also is provided at the end adjacent electrode 40 with a flange 38, as shown, which abuts the corresponding end of insulator 20 when capillary 30 is in the operative position thereof. Flange 38 also serves to prevent capillary 30 from being displaced toward pumping unit 70 by the pressure differential, to be described in more detail hereinbelow, which is created between electrodes 40 and 50.

Since capillary 30 does not need to be water-cooled, as is conventionally done, the discharge current within capillary 30 can be much larger than that obtained with conventional sources.

Electrode 40 comprises a support housing 41, an electrically-conductive insert 44 defining bore 42 removably mounted in housing 41, and an electrically-conductive end plate 46 removably mounted on the distal end of housing 41.

Support housing 41 preferably has a cylindrical outer surface to minimize the inductance of source 10, and is provided with an annular flange or collar 43 which is configured to receive insulator 20 and to cooperate with a weldable metal-to-ceramic seal 24 to form a vacuum tight (to helium mass spectrometer tests) seal between housing 41 and insulator 20. As shown, seal 24 is disposed at a location on insulator 20 which is remote from bores 32 and 42, and hence is isolated from the electrical discharges which occur therein. It has been found that the No. 1137 flange incorporated in terminal bushings for high voltage insulators manufactured by the Alberox Corporation is suitable for use as seal 24. Housing 41 also includes a water jacket 45 for cooling of electrode 40. Water is provided to jacket 45 from a source (not shown) by means of couplings 47.

Insert 44 preferably is tubular to minimize the inductance of source 10. As will be discussed in more detail hereinbelow, the dimensions of bore 42 generally are not critical, but do effect the production of the ion spectra. In addition, the greater is the length of insert 44, and the larger is the diameter of bore 42, the higher is the amperage of the current which can be maintained in the glow discharge operating mode (as distinct from the arc mode), and thus the greater is the intensity of the light output which is possible.

To accommodate embodiments of insert 44 which are shorter than housing 41, an electrically conductive spacer 49 having an orifice therein many advantageously be disposed between plate 46 and the distal end of insert 44, as shown, so as to prevent displacement of insert 44 within housing 60. This also minimizes any discharge reaching into plate 46 and plug 67 disposed in inlet 65, to be described in more detail hereinbelow.

Figures 3, 5, 6, 7, 8:
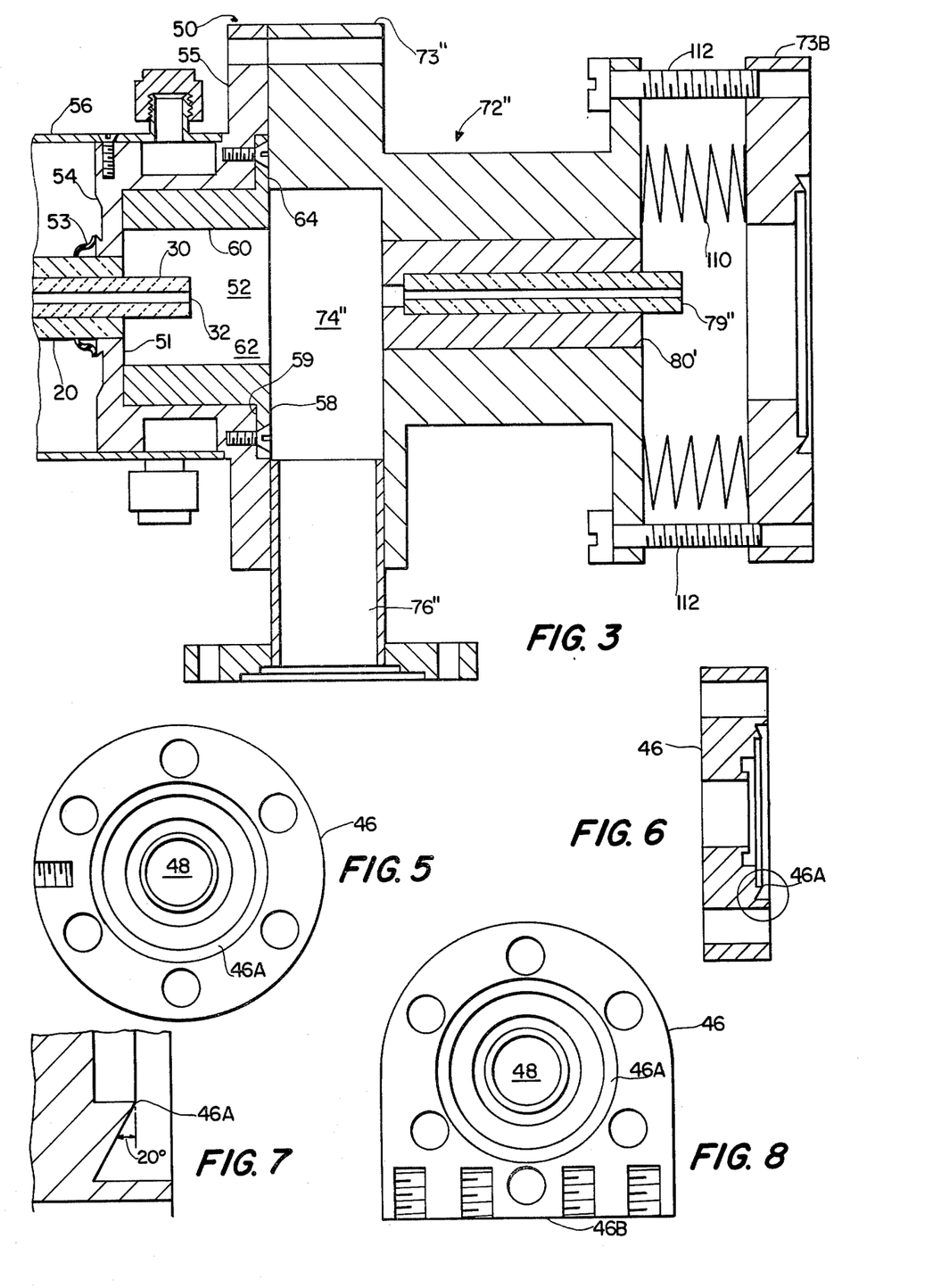
FIG. 3 is a cross-sectional side elevation view of a portion of the vuv light source illustrated in FIG. 1 employing a third embodiment of element 70, which can of course be an integral part of 50.
FIG. 5 is an end view of a first embodiment of element 46.
FIG. 6 is a cross-sectional side-elevation view of the embodiment of element 46 as illustrated in FIG. 5.
FIG. 7 is an enlarged detail view of FIG. 6.
FIG. 8 is an end view of a second embodiment of element 46.

As shown in FIGS. 5-7, the surface of plate 46 which mates with the distal end of housing 41 has a plurality of recesses formed therein, the outermost of which define a knife edge 46A that is compatible with metal seals, such as Varian type seals, and the innermost of which can accept the Varian square O-rings.

End plate 46 of electrode 40 is also provided with an opening 48 through which ionizable gas is introduced from a source (not shown) via an inlet 65. A porous plug 67, such as a wad of glass wool, or other device which causes a large pressure change, is disposed within inlet 65 as close as possible to bore 42 to prevent the discharge from taking place within the inlet regardless of how low the pressure of the gas is within bore 42.

As should be apparent from the foregoing description, insert 44 is readily removed from housing 41 simply by removing end plate 46, and capillary 30 is readily removed from insulator 30 simply by removing end plate 46 and insert 44 from housing 41 and sliding capillary 30 out through housing 41. Substitution of various embodiments of insert 44 and capillary 30 in order to optimize the performance of source 10 may thus be easily accomplished without disassembling the basic supporting structure, and thus without impairing the alignment of the various components of source 10.

As will be discussed in more detail hereinbelow, introducing the ionizable gas at the distal end of electrode 40 aids in the creation of a pressure drop through capillary 30 which enhances the light output of source 10. A further advantage of introducing the gas in this manner is that the gas flow produces a flushing action which cleans source 10.

For operation of source 10 in the dc or glow discharge mode, a first embodiment of plate 46 advantageously is employed which has a circular peripheral configuration, as shown in FIG. 5. For operation of source 10 in the ac or pulse discharge mode, a second embodiment of plate 46 advantageously is used which has a partially linear peripheral configuration as shown in FIG. 8, so as to define a straight edge 46B which accommodates a flat, plate-like electrical conductor 94, as shown in FIG. 2.

Electrode 50 comprises an electrically conductive support member 54 which supports insulator 20; an electrically conductive housing 56 connected to support member 54 and surrounding electrode 40; and optionally, but advantageously, an electrically conductive insert, generally denoted 58, mounted on support member 54.

Support member 54 is configured so as to at least partially define cavity 52, which constitutes an expansion chamber when source 10 is operated in the spark discharge mode, and which receives the embodiment of insert 58 which preferably is employed when source 10 is operated in the glow discharge mode. Cavity 52 preferably is cylindrical, and is partially defined by a radially extending wall 51, in which is formed an aperture that supportingly receives insulator 20. A metal-to-ceramic seal 53 similar to seal 24 provides a vacuum seal between insulator 20 and wall 51. As is the case with seal 24, seal 53 is located at a position remote from cavity 52 and bore 32, and hence is isolated from the electrical discharges which occur therein.

Support member 54 further comprises a flange 55 which is adapted for releasably connecting electrode 50 to pumping unit 70 thus facilitating substitution of various embodiments of pumping unit 70 as desired. Support member 54 may also be provided with a water jacket 57, as shown in FIGS. 1 and 2 for cooling electrode 50 when source 10 is operated in the pulse discharge mode and at high power levels in the glow discharge mode.

Figure 1:
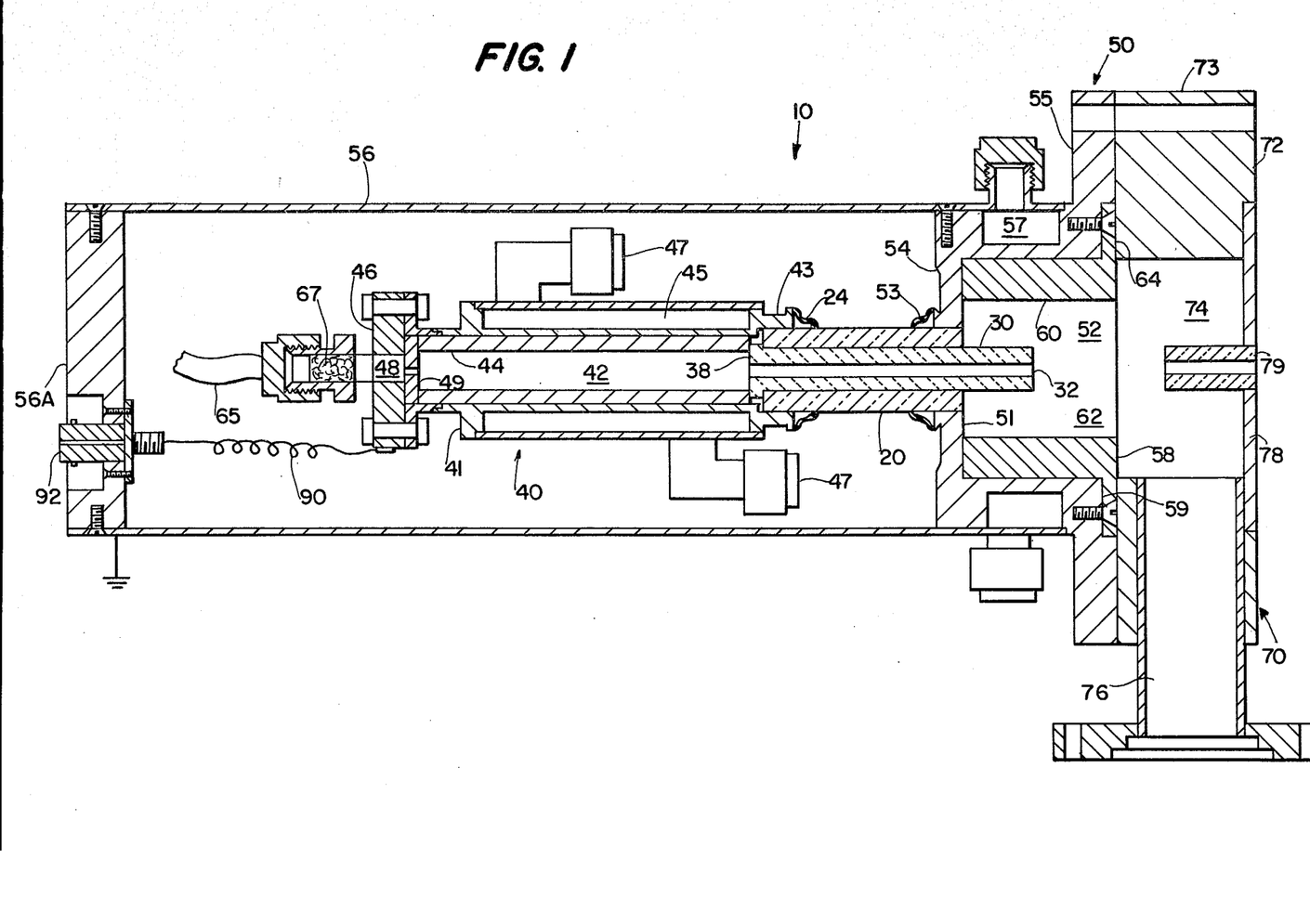
FIG. 1 is a cross-sectional side-elevation view of a vuv light source constructed in accordance with the present invention employing embodiments of individual elements which optimize the glow discharge operation thereof, and employing a first embodiment of element 70.

For glow discharge operation of source 10, an embodiment of electrode insert 58 is employed which comprises, as shown in FIG. 1, a tube 60 defining a bore 62 which is coaxially aligned with the optical axis of source 10, and a peripheral mounting flange 64 at the distal end thereof which cooperates with a recess 59 in support member flange 55 for removable mounting of the insert within support member 54.

For glow discharge operation, the diameters of electrode bores 42 and 62 are generally not critical. However, it has been discovered that spectra of ions, e.g., the helium ion line at 304 Å, which is very important in photoelectron spectroscopy, are greatly enhanced if the diameter of either bore 42 or 62, and especially bore 62, is approximately the same as that of capillary bore 32. Further, in order to enhance spectra of ions, it is preferable that the length of bore 62 be at least 2 cm. It is to be noted, though, that in order to discriminate between the two helium lines, HeI (584 Å) and HeII (304 Å), so as to produce primarily the HeI line, bores 42 and 62 should be much larger in diameter than bore 32.

Figure 2:
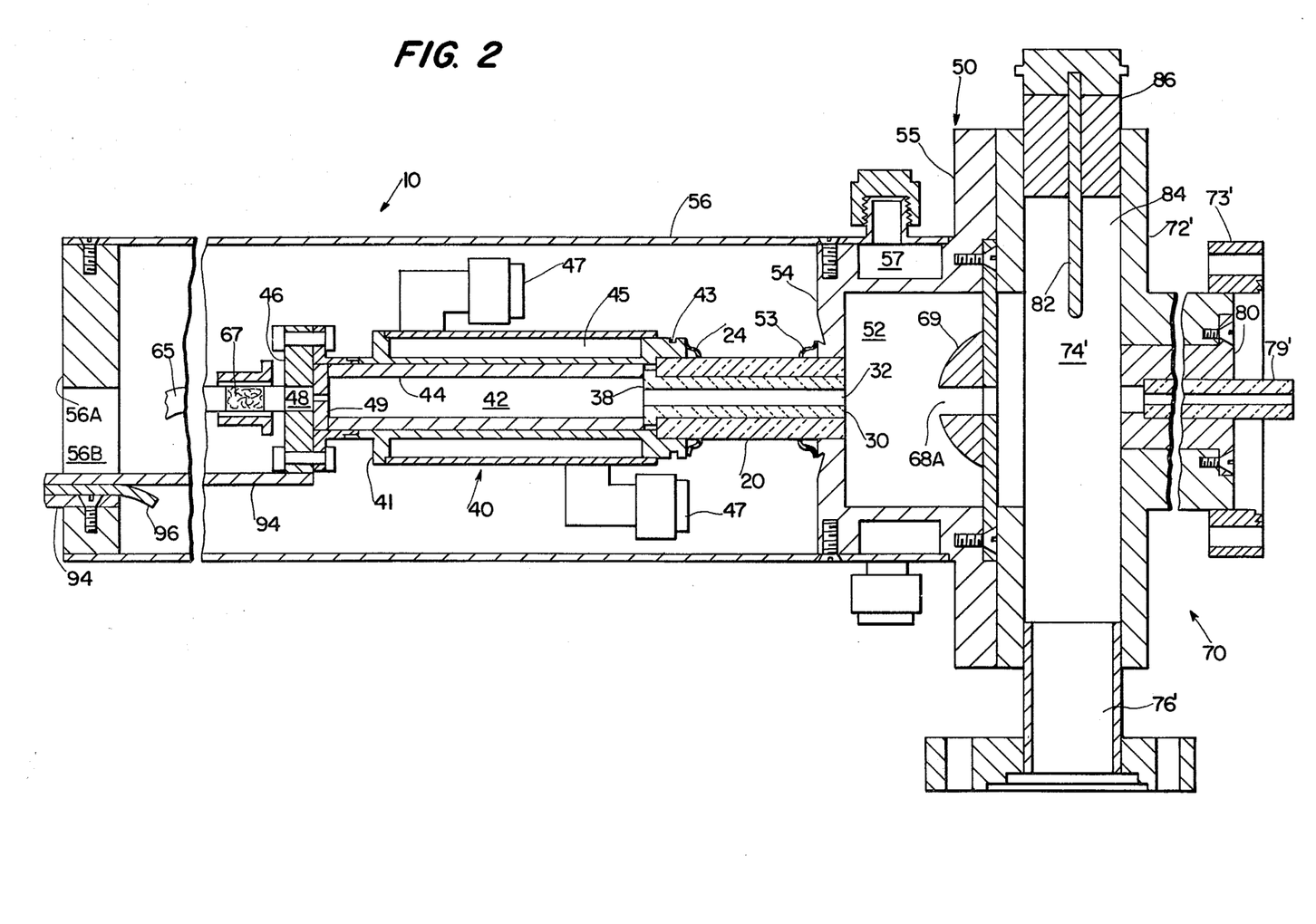
FIG. 2 is a cross-sectional side-elevation view of the vuv light source illustrated in FIG. 1 employing embodiments of individual elements which optimize the spark discharge operation thereof, and employing a second embodiment of element 70.

For spark discharge operation of source 10, an embodiment of electrode insert 58 is employed which comprises, as shown in FIG. 2, a plate 66 which is mounted in flange recess 59 so as to be axially spaced from capillary 30 and orthogonal to the optical axis of source 10. Plate 66 defines an opening 68 which is coaxial with the optical axis of source 10, and is provided with a plurality, preferably six, of radially oriented fins 69 symmetrically disposed about opening 68 and projecting perpendicularly outwardly from plate 66 toward capillary 30. As shown, each fin 69 advantageously has the shape of a quarter sector, with a linear edge aligned with the optical axis of source 10 and contiguous with the edge of plate 66 defining opening 68, such that fins 69 define a discontinuous passage-like extension 68A of opening 68 within support member cavity 52. The purpose of fins 69 is to deflect the high energy charged particles of the discharge away from the optical axis of source 10, and thereby prevent charged material from penetrating into the apparatus with which source 10 is being used and interfering with the operation thereof.

It is to be noted that a finned plate similar to plate 66 may be used in combination with tube 60 when source 10 is operated in the glow discharge mode to obtain the advantages of the particle deflecting feature of fins 69.

As noted hereinabove, in the spark discharge operating mode, cavity 52 constitutes an expansion chamber which provides a volume in which the shock wave generated by the discharge can expand and dissipate its energy, and thereby minimize the amount of dust, ceramic, or electrode material which passes into the other apparatus with which source 10 is being used.

Housing 56 preferably is cylindrical, as small in diameter as possible, and mounted in coaxial alignment with the optical axis of source 10, so as to reduce the inductance of source 10. Housing 56 also serves as a safety shield to protect the operator from electrical shocks.

Housing 56 is also provided with a removable end cap 56A to allow substitution of embodiments thereof which are adapted to accommodate the electrical connectors, to be described in more detail hereinbelow, which are used in the glow discharge and spark discharge modes of operation.

In the dc or glow discharge mode of operation, conventional electrical connectors capable of handling start-up voltages of up to 3000 volts and currents of up to ten amperes are employed. Such connectors are schematically depicted at 90 in FIG. 1, the "hot" connector for electrode 40 being connected to plate 46 thereof after passing through a first embodiment of housing end cap 56A by means of a conventional pass-through insulator 92.

Referring to FIG. 2, a parallel plate transmission line, comprising flat, or plate-like connectors 94 separated by an insulating sheet 96 made of teflon or other type of insulating material, preferably is employed for spark discharge operation in order to provide low inductance and to handle the high voltages and currents which may be employed. As shown, the connector 94 for electrode 40 is attached to straight edge 46B of the second embodiment of end plate 46 after passing through an opening 56B in a second embodiment of end cap 56A, while the connector 94 for electrode 50 is attached to the bottom edge of opening 56B.

Source 10 operates most effectively if a relatively high gas pressure is provided in bore 42 in order to maintain the discharge, while as low a pressure as possible is maintained along the optical path from the discharge capillary 30 to the apparatus in which the light produced by source 10 is to be utilized in order to minimize the absorption of the light by the gas introduced into source 10. A rapid decrease in the gas pressure as electrode 50 is approached is thus needed. This pressure drop is achieved in the present invention by (i) using embodiments of capillary 30 having narrow diameter bores 32, on the order of one to three millimeters, to provide a resistance to the gas flow; (ii) introducing the ionizable gas into electrode 40 at the distal end thereof, thereby establishing a gas flow directed toward capillary 30; and (iii) "fast pumping", or substantially evacuating a region including the optical path between capillary 30 and the apparatus in which the light produced by source 10 is utilized. The fast pumping is accomplished by pumping unit 70, which may comprise a conventional differential pumping system.

Preferred embodiments of unit 70 are illustrated in FIGS. 1–4. As will be appreciated by those of ordinary skill in the art, although unit 70 has been illustrated as a separate unit from electrode 50, unit 70 may advantageously be an integral part of electrode 50. The various embodiments of unit 70 have similar elements, which have been denoted by like numerals with primes attached, and, in the interest of clarity, the description thereof will not be repeated for each embodiment. The embodiment shown in FIG. 1 comprises a hollow member 72 defining an evacuatable region 74, and having a flange 73 for connecting the unit between electrode 50 and the apparatus (not shown) in which the light produced by source 10 is to be used. Region 74 is connected by a port 76 to a differential pump (not shown) capable of pumping at least 10.6 liters/second (4.8 Kg/sec) for helium. A plate 78 having a capillary 79 with a narrow diameter bore coaxially aligned with the optical axis of source 10 is connected across the distal end of member 72. Preferably, capillary 79 is made of glass so as to function as a light pipe to channel and increase the light output of source 10. Capillaries having bores of differing lengths and diameters may be employed, the efficiency of the differential pumping being linearly proportional to the cube of the diameter of the bore and inversely proportional to the length of the bore.

The preferred embodiment of pumping unit 70 illustrated in FIG. 2 differs from that illustrated in FIG. 1 in that capillary 79' is mounted in a tubular, metallic support 80, rather than a plate similar to plate 78. Support 80 has the advantage of also acting as a conductor for the discharge as it leaves capillary 30. A trigger pin 82, which is connected to a source of high voltage (not shown), and which extends into evacuatable region 74' through a port 84, is also provided for generating a high voltage pulse if necessary to start the discharge. Pin 82 is mounted within port 84 by means of an insulating support 86 which is welded to member 72' to form a vacuum tight seal.

The preferred embodiment of pumping unit 70 illustrated in FIG. 3 differs from that illustrated in FIG. 1 in that a second connecting flange 73B is connected to the rest of member 72" by a flexible bellows 110 and adjusting screws 112, as shown, to allow the optical axis of source 10 to be varied with respect to the longitudinal axis of flange 73B, and hence with respect to the optical axis of the apparatus to which source 10 is connected. This variable feature allows precision alignment of source 10 with a target.

Figure 4:
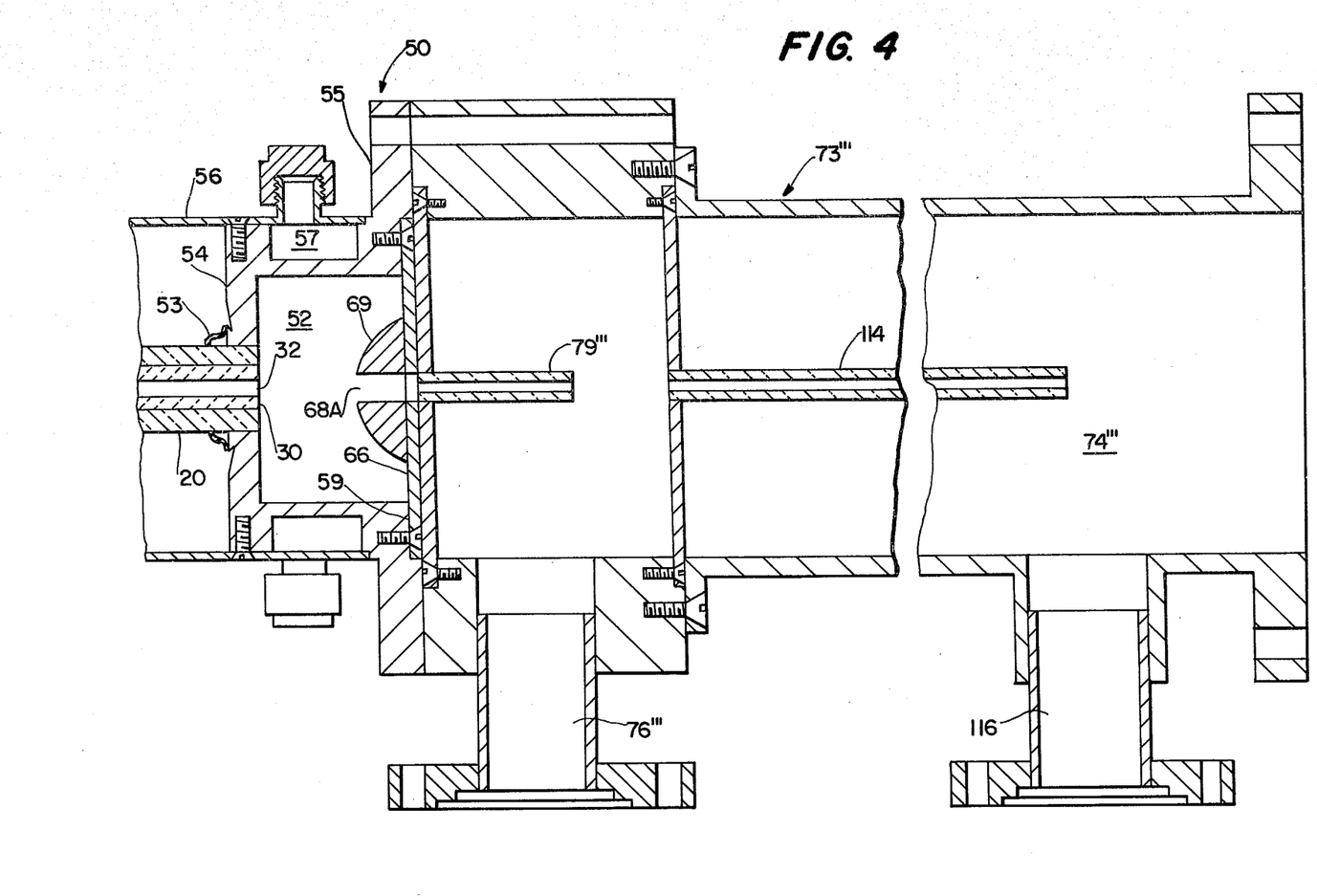
FIG. 4 is a cross-sectional side-elevation view of a portion of the vuv light source illustrated in FIG. 2 employing a fourth embodiment of element 70.

The preferred embodiment of pumping unit 70 illustrated in FIG. 4 is designed for ultra high vacuum work, and differs from the embodiment illustrated in FIG. 1 in that another plate-mounted capillary 114 and pumping port 116 are added as shown to provide a second stage of differential pumping. Further, port 76''' is disposed between capillary 79''' and capillary 114, rather than between discharge capillary 30 and capillary 79''' as is the case in the embodiment of FIG. 1. Both capillaries 79''' and 114 advantageously have bores with one millimeter diameters. Capillary 79''' preferably is 2 cm in length, while capillary 114 is preferably at least 20 cm long to allow the second stage of pumping to provide the bulk of the pressure differential. For example, region 74''' advantageously is pumped through port 76''' at a rate of 3.6 liters/sec, and through port 116 at a rate of 400 liters/sec. When source 10 is being used as a helium source with the gas being introduced into electrode 40 at a pressure of 200/$\mu$, the first stage of pumping achieves a pressure ratio of 220, and the second stage achieves a pressure ratio of $2.4 \times 10^5$, for a total pressure ratio of approximately $5.3 \times 10^7$. Higher ratios can be achieved with suitable choices of capillary lengths and pumping speeds.

For dc glow discharge operation of source 10, electrode 40 is normally biased at a negative potential, which is initially between approximately $-2000$ and $-3000$ volts in order to strike the discharge, and thereafter between approximately $-400$ and $-600$ volts in order to maintain the discharge. Depending on the dimensions of electrode insert 44, the current may be varied from a few milliamps up to as much as 100 amps.

The spectral output produced by source 10 in the glow discharge mode of operation varies in wavelength depending on the gas used, and, with the exception of rare gases, can range from about 900 Å through the visible portion of the spectrum. In the case of the rare gases, the characteristic resonance lines of the neutral and first ionized atoms will be obtained, e.g., with helium the HeI 584 Å and HeII 304 Å lines appear.

For ac or spark discharge operation, pulses of up to 5000 volts and 3000 amps peak current are typically applied to electrode 40, which result in the production of intense emission spectra that are characteristic of the gas atoms which are being excited. The duration of the light output resulting from each discharge can be varied depending on the size of the capacitor used in the power supply to produce nanosecond to millisecond pulses. The repetition rate of the discharge may also be varied from one to several thousand pulses per second, but typically the rate ranges between 10 and 100 pulses/second. Although any gas may be used, nitrogen, oxygen, argon, or neon are most often used. Emission spectra having wavelengths as short as 90 Å have been achieved.

Although the invention has been described with respect to exemplary embodiments thereof, it will be understood that variations and modifications can be effected in the embodiments without departing from the scope or spirit of the invention.

I claim:
1. In a vacuum ultraviolet gas discharge light source, the combination comprising:
   an insulator;
   a capillary defining a first bore removably and at least partially mounted within said insulator;
   a first, hollow electrode defining a second bore disposed in end-to-end relationship with a first end of said capillary such that said second bore communicates with said first bore, said first electrode comprising a housing having a collar configured to receive said insulator, an electrically conductive insert removably mounted in said housing, and a removable end plate at the distal end thereof for removal of said insert by axial displacement thereof;
   a second, hollow electrode defining a cavity disposed such that said cavity is adjacent a second end of said capillary and communicates with said first bore, said capillary and said first and second electrodes being configured such that said first and second bores and said cavity are in coaxial alignment and define an optical axis; and
   seal means for connecting said first and second electrodes to said insulator such that a gas-tight seal is formed between each of said electrodes and said insulator; said capillary including a flange at said first end thereof which abuts the corresponding end of said insulator when said capillary is operatively disposed within said insulator and thereby achieves precise relative positioning of said capillary.

2. The light source of claim 1 wherein said first and second electrodes and said capillary and insulator have substantially continuous and cylindrical longitudinal surfaces, and said second electrode comprises a housing surrounding said first electrode and insulator, thereby minimizing the inductance of said source.

3. The light source of claim 1 wherein said first bore is dimensioned such that a pressure sufficient to maintain an electrical discharge in an ionizable gas may be attained in said second bore and a pressure differential may be created in said first bore wherein the pressure is minimized in said first bore at said second end thereof, and said source further comprises
   means for introducing ionizable gas into said second bore at the distal end thereof; and
   means for evacuating at least a portion of said cavity including said optical axis, thereby maximizing the intensity of the vacuum ultraviolet radiation which is produced.

4. The light source of claim 1 wherein said second electrode further comprises a support member defining said cavity and configured so as to support said insulator, to cooperate with said seal means, and to releasably support either (i) a tubular insert adapted for glow discharge operation of the source in coaxial alignment with said optical axis or (ii) a plate insert adapted for spark discharge operation of the source and having an opening in the center thereof such that said plate is axially spaced from said second capillary end in orthogonal relationship to said optical axis, and with said plate opening coaxially aligned with said optical axis.

5. The light source of claim 3 wherein said evacuating means comprises light-conductive capillary means defining a constricted bore and functioning as a light pipe to channel the light emitted from said capillary disposed in coaxial alignment with said optical axis and spaced from said capillary.

6. The light source of claim 1 wherein said first electrode housing is configured such that said insert abuts said capillary flange when said first electrode is in an assembled condition to maintain said capillary fixedly in position and such that said capillary may be replaced by removing said end plate and axially displacing said insert and then said capillary.

7. The light source of claim 1 wherein said insulator is made of a ceramic and is free of auxilliary cooling means; said first electrode housing is configured for liquid cooling of said first electrode; and said seal means comprise metallic seals disposed at locations isolated from said first and second bore and from said cavity.

8. In a vacuum ultraviolet gas discharge light source, the combination comprising:

an insulator;

a capillary defining a first bore at least partially mounted within said insulator;

a first, hollow electrode defining a second bore disposed in end-to-end relationship with a first end of said capillary such that said second bore communicates with said first bore;

a second, hollow electrode defining a cavity disposed such that said cavity is adjacent a second end of said capillary and communicates with said first bore;

said capillary and said first and second electrodes being configured such that said first and second bores and said cavity are in coaxial alignment and define an optical axis, and said second electrode further comprises means defining within said cavity a third bore in coaxial alignment with said optical axis; the diameter of at least one of said second and third bores corresponding to the diameter of said first bore; and said third bore being at least two centimeters long, thereby enhancing the spectra of ions which are produced when said source is operated in a glow discharge mode.

* * * * *